United States Patent [19]
Hirobe

[11] Patent Number: 4,535,364
[45] Date of Patent: Aug. 13, 1985

[54] SPOT EXPOSURE ADJUSTMENT CIRCUIT

[75] Inventor: Hitoshi Hirobe, Tokyo, Japan

[73] Assignee: Asahi Kogaku Kogyo Kabushiki Kaisha, Tokyo, Japan

[21] Appl. No.: 320,029

[22] Filed: Nov. 10, 1981

[30] Foreign Application Priority Data

Nov. 13, 1980 [JP] Japan .................................. 55-159898

[51] Int. Cl.³ .............................................. H04N 5/193
[52] U.S. Cl. ................................................... 358/228
[58] Field of Search ................. 358/228, 37, 166, 168, 358/169, 170, 174, 176, 183, 21 R, 27, 41

[56] References Cited

U.S. PATENT DOCUMENTS

| 4,318,132 | 3/1982 | Machida | 358/228 |
| 4,325,083 | 4/1982 | Rouchon et al. | 358/228 |
| 4,353,092 | 10/1982 | Bailey et al. | 358/166 |
| 4,365,272 | 12/1982 | Nagai | 358/228 |
| 4,409,620 | 10/1983 | Enomoto | 358/228 |

FOREIGN PATENT DOCUMENTS 59030 5/1979 Japan .............................. 358/21 R Primary Examiner—Tommy P. Chin
Attorney, Agent, or Firm—Sughrue, Mion, Zinn, Macpeak and Seas

[57] ABSTRACT

A television camera of the type having an image pickup element for converting the image of an object to be photographed into an electrical signal having an exposure control circuit with a voltage detector and controlling the exposure according to the voltage level of said electrical signals. A spot selection circuit provides the exposure control apparatus with signals corresponding to a portion of the image less than the entire image. The exposure of the entire image is controlled in accordance with the detected voltage levels of electrical signals corresponding to the image portion.

2 Claims, 5 Drawing Figures

SPOT EXPOSURE ADJUSTMENT CIRCUIT

BACKGROUND OF THE INVENTION

This invention relates to an automatic exposure adjustment circuit in a television camera, which adjusts the video signal output voltage according to the luminance of an object to be photographed. The invention is intended to continuously set an exposure value for an object which the photographer wishes to photograph independently of the ambient light conditions.

In a conventional television camera, exposure adjustment is effected according to the brightness of an object to be photographed, in a method which will be briefly described with reference to FIG. 1. The image of an object to be photographed is converted into an electrical signal by an image pickup element 1. Since the electrical signal is weak, it is amplified by a video amplifier 2. The voltage level of the signal thus amplified is detected by a level detector 3. In the case where the image pickup element 1 is a vidicon, the target voltage, i.e. the voltage applied to the pick-up, is varied by an exposure control circuit (or an ASC circuit) 4 with the aid of the aforementioned voltage, to vary the photoelectric conversion characteristics, whereby the exposure control is carried out to provide a satisfactory image at all times. In the case where the image pickup element 1 is a Saticon, the exposure control is effected by varying the opening of the stop in the optical system. However, those conventional methods are disadvantageous in that, in the case of back lighting or in the case where a bright spot is included in an image plane, the exposure is determined from the luminance of the bright spot (instead of the luminance of an object to be photographed), and accordingly the object appears dark.

SUMMARY OF THE INVENTION

An object of this invention is to eliminate the above-described difficulty.

Briefly, this is achieved according to the present invention by placing a switch between the output of video image signals and the level detection circuitry in the exposure correction system. The video signals scan the image and the analog switch is energized during only predetermined selectable periods during the vertical and horizontal scans. Thus, only the video signals from a defined portion of the image are used to determined the proper exposure level.

BRIEF DESCRIPTION OF THE DRAWINGS

One embodiment of this invention will be described with reference to the accompanying drawings, in which.

DETAILED DESCRIPTION OF THE INVENTION

Figure 2:
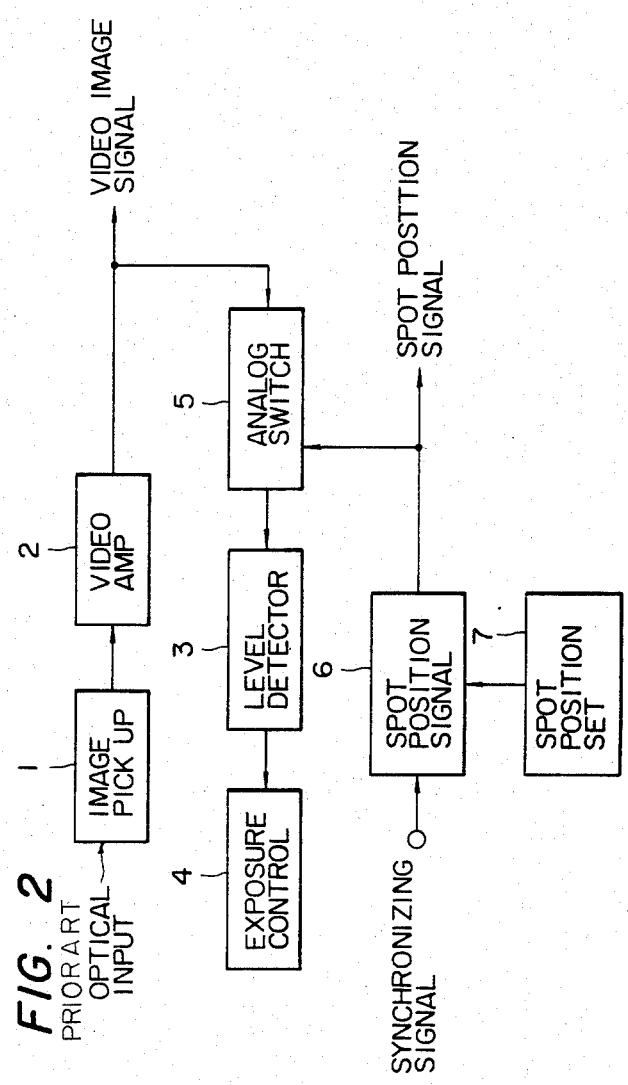
FIG. 2 is a block diagram showing one example of a spot exposure adjustment circuit according to this invention.

FIG. 2 is a block diagram of a spot exposure control adjustment circuit according to this invention. The operation of the invention will be described with reference to FIGS. 2 through 5.

Figure 3:
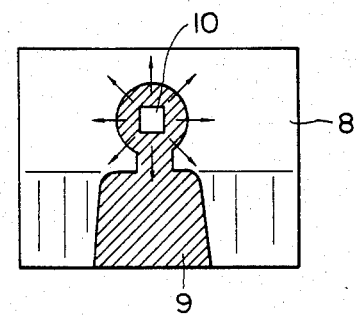
FIG. 3 is an explanatory diagram showing a television image.

First, the final object of the operation will be described with reference to FIG. 3. FIG. 3 shows a television image 8. The image of an object 9 to be photographed is indicated as a hatched area in the central portion of the television image 8. A white square in the image of the object 9 is a spot 10 for controlling the exposure. The spot 10 can be moved to any point in television image 8 by the operator. In other words, by moving the spot 10 to a point which the operator considers important in the photograph, the exposure of that point can be controlled correctly.

Figure 1:
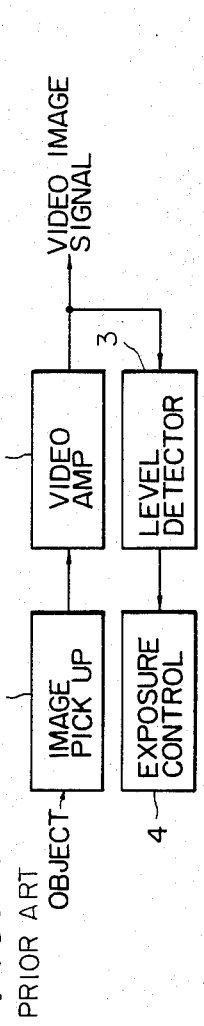
FIG. 1 is a block diagram of a conventional exposure control circuit.

In order to achieve the above-described final object, a control system shown in the block diagram of FIG. 2 is provided wherein like components are designated by like reference characters as in FIG. 1. As is apparent from the comparison of FIG. 2 with FIG. 1, an analog switch 5 which is turned on and off by a signal from a spot position signal generating circuit 6 is connected between the video amplifier 2 and the level detector 3 of the conventional exposure control system, so that the video signal of only a particular spot point will be passed to the level detector 3, and the exposure of the entire picture can then be controlled in accordance with the particular point brightness. The level of the video signal of the particular point is detected to operate the exposure control circuit (such as an ASC circuit or an auto-iris circuit) 4 to thereby control the image pickup element 1 or the stop, whereby a correct exposure can be obtained for the spot point. In FIG. 2, reference numeral 7 designates a spot position setting section for setting the spot 10 at a desired position. The spot position setting section 7 is connected to the spot position signal generating circuit 6, to move the spot 10 vertically and horizontally.

Figure 5:
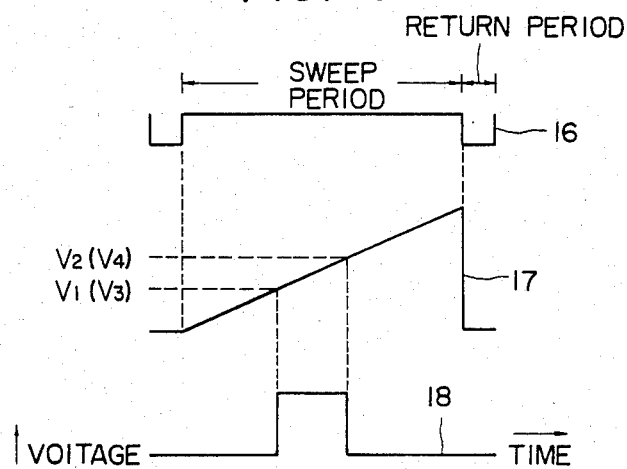
FIG. 5 is a time chart showing waveforms in the circuit shown in FIG. 4.
Figure 4:
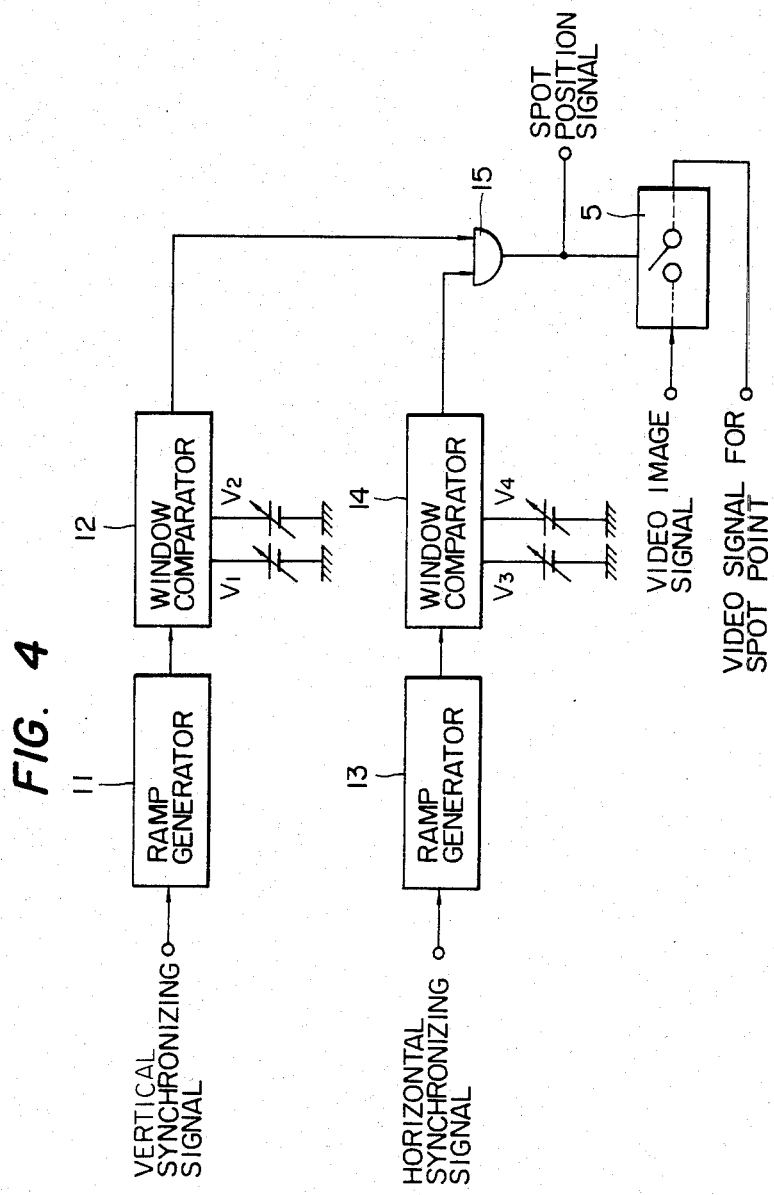
FIG. 4 is a block diagram showing one example of a spot position signal generating circuit in the circuit shown in FIG. 2.

One example of the spot position signal generating circuit 6 is as shown in FIG. 4. FIG. 5 is a time chart showing the waveforms of signals in the circuit 6 in FIG. 4. The spot position signal generating circuit 6 comprises: ramp wave generating circuits 11 and 13; window comparators 12 and 14 and an AND circuit 15. When vertical and horizontal synchronizing signals (having a waveform 16 in FIG. 5) are applied to the circuit 6, the output voltage (each having a waveform 17 in FIG. 5) of the ramp wave generating circuits 11 and 13 are linearly increased from the starting points of the input signal sweep periods. The output voltages of the ramp wave generating circuits 11 and 13 are applied to the window comparators 12 and 14, respectively. Only when the input voltage of the comparator 12 is between the comparison voltages $V_1$ and $V_2$ of the aforementioned spot position setting section 7, the output voltage of the comparator 12 is raised; and when the input voltage is not between the voltages $V_1$ and $V_2$, the output voltage is lowered (as indicated by a waveform 18 in FIG. 5). In this case, $V_2 > V_1$. Similarly, only when the input voltage of the comparator 14 is between the comparison voltages $V_3$ and $V_4$ of the spot position setting section 7, the output voltage of the comparator 14 is raised; and when the input voltage is not between the comparison voltages, the output voltage is lowered. In this case, $V_4 > V_3$. If one of the generators 11 and 13 is triggered at the beginning of each vertical sweep, its voltage will be proportional to a vertical image position. If the other generator is triggered at the beginning of every horizontal sweep, its voltage will be proportional to a horizontal image position.

Accordingly, in the circuit in FIG. 4, the vertical position, for example, can be varied by varying the comparison voltage $V_1$. If, in this case, the comparison voltage $V_2$ is varied simultaneously with the difference between the voltages $V_2$ and $V_1$ ($V_2-V_1$) maintained unchanged, then only the position of the spot can be changed while the size of the spot remains the same. Similarly, the spot can be moved horizontally by changing the voltages $V_3$ and $V_4$. The vertical and horizontal comparator outputs thus obtained are applied to the AND circuit 15, to provide a spot position signal. If the video signal is selected through the switch 5 which is turned on and off by the spot position signal, then switch 5 will provide a video signal output only for the spot point in the television image shown in FIG. 3. Accordingly, if the exposure is controlled by utilizing the level of the video signal thus selected, then the object of this invention can be achieved. The spot position can be indicated in the view finder by utilizing the spot position signal outputted by the spot position signal generating circuit 6.

As is apparent from the above description, the exposure can always be set for an object that the operator wants to photograph, according to this invention. Therefore, an image exposure which complies more with the desires of the photographer can be obtained. Under various photographing conditions, the photographer can take suitable pictures at all times, and more satisfactory television image can be provided.

It should be appreciated that various modifications could be made to the embodiment described above without departing from the spirit and scope of this invention. For instance, instead of a simple switch 5, the electrical signals could be briefly stored in a memory and then only a discrete portion of the stored signals read out to the exposure control circuitry, the final result being substantially the same.

What is claimed is:

1. In a television camera of the type having an image pickup element for converting the image of an object to be photographed into electrical signals, an exposure control apparatus having a voltage detector and controlling the exposure of said image according to the voltage level of said electrical signals, the improvement comprising:

spot selection means for providing to said exposure control apparatus electrical signals corresponding to a portion of said image less than the entire image, whereby the exposure of said entire image is controlled in accordance with the detected voltage levels of said electrical signals corresponding to a portion of said image and further comprising a switch for receiving said electrical signals corresponding to said image and passing said electrical signs to its output in response to a control signal; and control means for providing said control signal to said switch only during reception by said switch of electrical signals corresponding to said image portion; said control means further comprises:

spot portion selection means operable by a camera operator for selecting at least one of the size and a position of said portion of said image; and spot selection signal generating means responsive to an output from said spot position selection means for providing said control signal to said switch; wherein said spot position selection means provides an output signal defining first, second, third and fourth voltage levels, and wherein said spot selection signal generating means comprises:

a first waveform generating circuit for generating a first signal having a voltage level which changes over the course of a vertical image scan, whereby the value of said first signal represents a vertical position of said image;

a second waveform generating circuit for generating a second signal having a voltage level which changes over the course of a horizontal image scan whereby the value of said second signal represents a horizontal position of said image;

first comparator means for providing an output signal when said first signal is between said first and second voltages;

second comparator means for providing an output signal when said second signal is between said third and fourth voltages; and means for providing said control signal to said switch during the simultaneous occurrence of output signals from both of said first and second comparator means.

2. The exposure control apparatus as claimed in claim 1, wherein said first and second waveform generating circuits each generate ramp waveforms when activated, and are activated by vertical and horizontal synchronization signals, respectively.

* * * * *